United States Patent
Jo et al.

(10) Patent No.: US 9,455,984 B2
(45) Date of Patent: *Sep. 27, 2016

(54) SECRET DATA MATCHING DEVICE, SECRET DATA MATCHING METHOD, AND RECORDING MEDIUM

(71) Applicant: FUJITSU LIMITED, Kawasaki-shi, Kanagawa (JP)

(72) Inventors: Yuka Jo, Kawasaki (JP); Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

This patent is subject to a terminal disclaimer.

(21) Appl. No.: 14/317,241

(22) Filed: Jun. 27, 2014

(65) Prior Publication Data
US 2015/0304320 A1    Oct. 22, 2015

(30) Foreign Application Priority Data
Jul. 11, 2013   (JP) .................. 2013-145874

(51) Int. Cl.
| | |
|---|---|
| H04L 9/32 | (2006.01) |
| H04L 29/06 | (2006.01) |
| G06F 21/32 | (2013.01) |
| G06K 9/00 | (2006.01) |

(52) U.S. Cl.
CPC ........... *H04L 63/0861* (2013.01); *G06F 21/32* (2013.01); *G06K 9/00885* (2013.01); *H04L 63/061* (2013.01); *G06K 2009/00953* (2013.01)

(58) Field of Classification Search
CPC ............. H04L 63/0861; H04L 9/3231; H04L 63/061; G06F 21/32; G06K 9/00885; G06K 2009/00953
See application file for complete search history.

(56) References Cited

U.S. PATENT DOCUMENTS

| | | | | |
|---|---|---|---|---|
| 6,055,638 A | * | 4/2000 | Pascal .................... | G06F 21/34 340/5.8 |
| 8,300,742 B1 | * | 10/2012 | Bromberg ........... | H04L 25/0234 375/285 |

(Continued)

FOREIGN PATENT DOCUMENTS

JP    2009-129292    6/2009

OTHER PUBLICATIONS

Korean Office Action dated Aug. 18, 2015 in corresponding Korean Patent Application No. 10-2014-0084388.

(Continued)

*Primary Examiner* — Michael S McNally
*Assistant Examiner* — Amie C Lin
(74) *Attorney, Agent, or Firm* — Staas & Halsey LLP

(57) ABSTRACT

A secret data matching device includes: a memory; and a processor coupled to the memory. The processor executes a process including: storing a first secret vector obtained by concealing first data and key data based on a first random number and a first linear combination of row vectors of a determination matrix which is different for each system including the secret data matching device and which is generated by attaching a random number vector as a last column to a matrix including diagonal components including a threshold value to determine whether the first data and second data are approximate to each other and a threshold value related to the key data; acquiring a second secret vector obtained by concealing the second data based on a second linear combination of row vectors of the determination matrix and a second random number.

4 Claims, 4 Drawing Sheets

(56) References Cited

U.S. PATENT DOCUMENTS

| | | | | |
|---|---|---|---|---|
| 2010/0040162 A1* | 2/2010 | Suehiro | ............... | H04L 25/0204 375/260 |
| 2011/0037563 A1 | 2/2011 | Choi et al. | | |
| 2013/0318351 A1 | 11/2013 | Hirano et al. | | |
| 2014/0136094 A1 | 5/2014 | Yasuda et al. | | |
| 2014/0325230 A1* | 10/2014 | Sy | ........................... | G06F 21/32 713/171 |

OTHER PUBLICATIONS

Extended European Search Report mailed on Sep. 3, 2014 in corresponding European Patent Application No. 14174932.5.

Belguechi, et al., "Operational bio-hash to preserve privacy of fingerprint minutiae templates", IET Biometrics 2013, vol. 2, Issue 2, p. 76-84.

Teoh, et al., "Cancellable biometrics and annotations on BioHash", Path Recognition 41, 2008, p. 2034-2044.

Rathgeb, et al. "A survey on biometric cryptosystems and cancelable biometrics", EURASIP Journal on Information Security 2011, p. 1-25.

A.K. Jain, K. Nandakumar and A. Nagar, Biometric Template Security (Review Article), EURASIP Journal on Advance in Signal Processing, 99. 1-17, 2008.

A. Juels and M. Wattenberg, "A fuzzy commitment Scheme," in Proceedings of 6$^{th}$ ACM Conference on Computer and Communications Security (ACMCCS '99), pp. 28-36, 1999.

A. Juels and M. Sudan, "A fuzzy vault scheme," in Proceedings of the IEEE International Symposium on Information Theory, p. 408, 2002.

Yuka Sugimura et al., "A proposal of key building technology using lattice masking", The Institute of Electronics, Information and Communication Engineers, Technical Report of IEICE, Section 3 to 4, Jul. 11, 2013, pp. 1-8.

Extended European Search Report dated Oct. 30, 2015 in European Patent Application No. 15171160.3 (corresponding to U.S. Appl. No. 14/730, 389).

*Lee et al., "Biometric Key Binding: Fuzzy Vault Based on Iris Images", ICB 2007, LNCS 4642, 2007, pp. 800-808.

U.S. Appl. No. 14/730,389, filed Jun. 4, 2015, Yuka Jo et al., Fujitsu Limited.

Korean Office Action dated May 2, 2016 in corresponding Korean Patent Application No. 10-2015-0086923.

* cited by examiner

MATRIX FOR APPROXIMATION DETERMINATION

RANDOM NUMBER VECTOR $$V = \begin{pmatrix} 20 & 0 & 0 & 7 & 5 \\ 0 & 10 & 0 & 4 & 3 \\ 0 & 0 & 14 & 5 & -2 \\ 0 & 0 & 0 & 20000 & -42 \\ 0 & 0 & 0 & 0 & 123 \end{pmatrix}$$

THRESHOLD VALUE OF KEY

SECRET DATA MATCHING DEVICE, SECRET DATA MATCHING METHOD, AND RECORDING MEDIUM

CROSS-REFERENCE TO RELATED APPLICATION

This application is based upon and claims the benefit of priority of the prior Japanese Patent Application No. 2013-145874, filed on Jul. 11, 2013, the entire contents of which are incorporated herein by reference.

FIELD

The embodiment discussed herein is related to a secret data matching device and the like.

BACKGROUND

Biometric authentication is a personal authentication technique using human physical characteristics and behavioral characteristics. Examples of the human physical characteristics include fingerprint, vein, iris, and DNA. Examples of the behavioral characteristics include handwriting and the like. In the biometric authentication, the authentication is performed by collecting biometric information called a template in advance and comparing the biometric information with information acquired by a sensor when matching is performed.

In recent years, attention is given to a biometric authentication technique in which a somewhat converted template is stored in a database and comparison is performed without restoring the original template when matching is performed. The biometric authentication technique is referred to as a "biometric template protection". In a system using the biometric template protection, even when a converted template is leaked, the leaked template is made unusable by changing a conversion method, so that it is possible to prevent the leaked template from being accessed.

In the biometric template protection, a plurality of security requirements are requested. One of the security requirements is diversity. The diversity is characteristics that a converted template cannot be cross-matched between a plurality of databases. In other words, the diversity means that converted templates of the same biometric information, which are stored in a plurality of databases respectively, have no commonality.

A template protection method of a so-called key binding method is known as one of the biometric template protection technique. The key binding method is a method in which a template indicating biometric information and auxiliary information generated from a user-unique key are stored in a database and the user-unique key is extracted if matching biometric information is sufficiently close to the template when matching is performed. In the key binding method, matching can be performed without registering the template itself that indicates the biometric information in the database.

Typical examples of a scheme that realizes the key binding method include fuzzy commitment and fuzzy vault which use a technique of error correcting code. It is known that the fuzzy commitment is a method that uses exclusive-OR of quantized biometric information and random information. It is known that the fuzzy vault conceals optional secret information by using a pair of pieces of information prepared in advance as a key. It is known that, in the key binding method by the fuzzy commitment or the fuzzy vault, the auxiliary information generated from a template and a user-unique key for the same biometric information includes a common portion (for example, see Non-Patent Documents 1 to 3).

Non-Patent Document 1: A. K. Jain, K. Nandakumar, and A. Nagar, "Biometric template security (review article)", *EURASIP Journal on Advances in Signal Processing*, pp. 1-17, 2008

Non-Patent Document 2: A. Juels and M. Wattenberg, "A fuzzy commitment scheme", in *Proceedings of 6th ACM Conference on Computer and Communications Security* (ACMCCS '99), pp. 28-36, 1999

Non-Patent Document 3: A. Juels and M. Sudan, "A fuzzy vault scheme", in *Proceedings of the IEEE International Symposium on Information Theory*, p. 408, 2002.

However, the schemes that realize the related key binding method have a problem that the schemes cannot satisfy the diversity that is one of the security requirements of the biometric template protection. In other words, in the key binding method by the fuzzy commitment or the fuzzy vault, the auxiliary information generated from a template and a user-unique key for the same biometric information includes a common portion, so that cross-matching can be done between a plurality of databases. That is, such a key binding scheme does not satisfy the diversity.

The above problem occurs not only in the matching of biometric information, but also in collation of numerical information such as positional information and confidential information.

SUMMARY

According to an aspect of the embodiments, a secret data matching device includes: a memory; and a processor coupled to the memory, wherein the processor executes a process including: storing a first secret vector obtained by concealing first data and key data based on a first random number and a first linear combination of row vectors of a determination matrix which is different for each system including the secret data matching device and which is generated by adding a random number vector as a last column to a matrix including diagonal components including a threshold value to determine whether the first data and second data are approximate to each other and a threshold value related to the key data; acquiring a second secret vector obtained by concealing the second data based on a second linear combination of row vectors of the determination matrix and a second random number; calculating a residual vector that is a residue when the determination matrix is used as a modulus from a difference between the first secret vector stored at the storing and the second secret vector acquired at the acquiring; determining whether or not the first data and the second data are approximate to each other based on the residual vector calculated at the calculating; and extracting key data from the residual vector when it is determined that the first data and the second data are approximate to each other as a result of the determination at the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The secret data matching device employs the key binding scheme of the biometric template protection. The embodiment does not limit the invention.

Configuration of Secret Data Matching System

Figure 1:
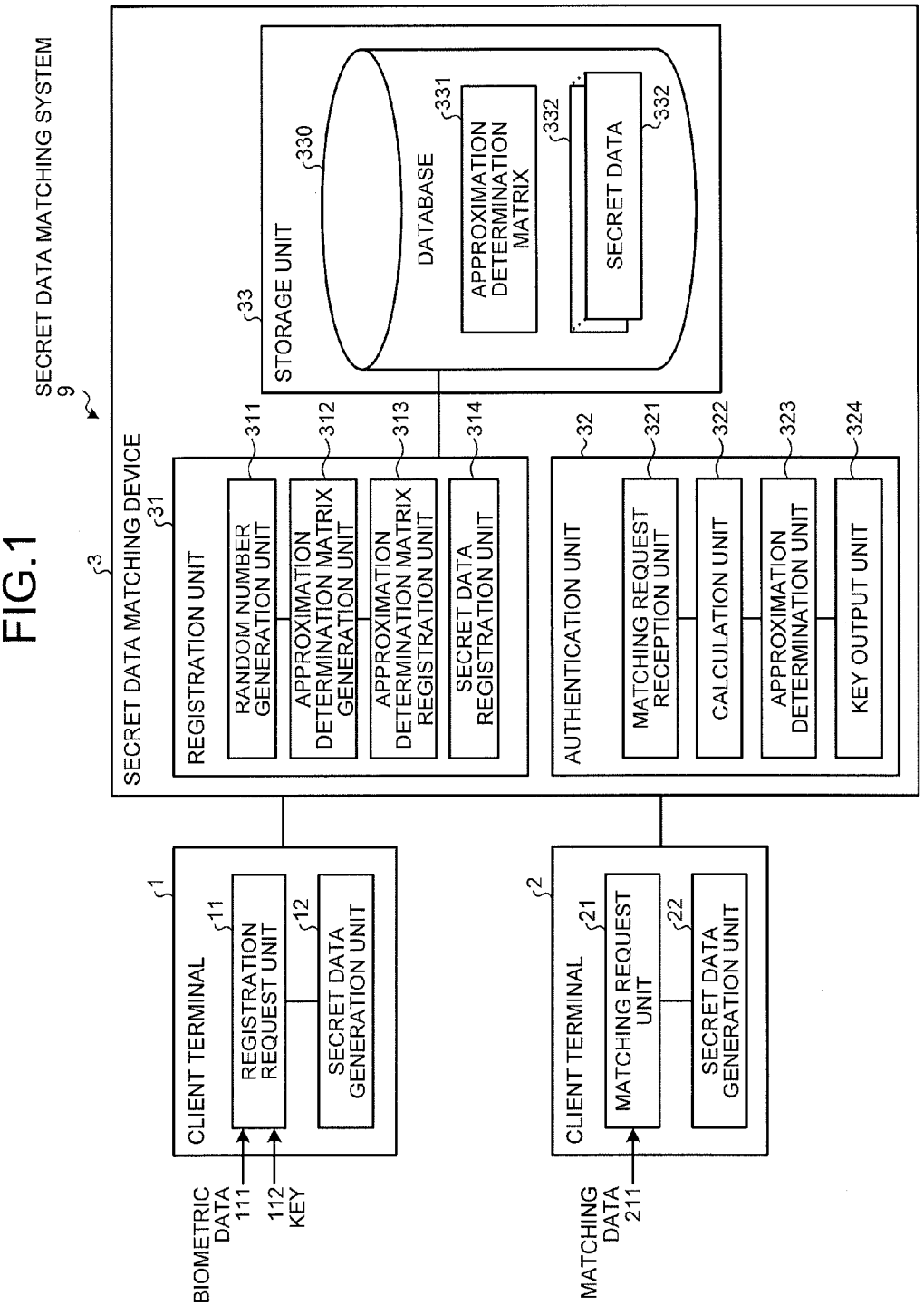
FIG. 1 is a diagram illustrating an example of a functional configuration of a secret data matching system according to an embodiment.

FIG. 1 is a diagram illustrating an example of a functional configuration of a secret data matching system according to the embodiment. As depicted in FIG. 1, a secret data matching system 9 includes a client terminals 1 and 2 and a secret data matching device 3. The secret data matching device 3 includes a database 330. The secret data matching device 3 and the client terminals 1 and 2 are connected by a network.

Here, the secret data matching system 9 conceals biometric data of a client and client-unique key data based on special random numbers (elements of lattice) called lattice masking and registers first secret data obtained by concealing the above data in the database 330. When the secret data matching system 9 receives a request for matching of biometric data, the secret data matching system 9 conceals the biometric data to be matched based on different elements of lattice and acquires second secret data obtained by concealing the biometric data. Then, the secret data matching system 9 determines whether or not the biometric data corresponding to the first secret data and the biometric data corresponding to the second secret data are approximate to each other from the difference between the first secret data and the second secret data by using a mapping specific to lattice theory. If the secret data matching system 9 determines that the biometric data corresponding to the first secret data and the biometric data corresponding to the second secret data are approximate to each other, the secret data matching system 9 extracts the key data from the first secret data and outputs the extracted key data to a request source. In the embodiment, for convenience of description, the client terminal 1 is assumed to be a terminal of a client who registers biometric data and the client terminal 2 is assumed to be a terminal which requests a matching of biometric data. There may be a plurality of client terminals 1. There may be a plurality of client terminals 2.

The concealing of biometric data and client-unique key data in the secret data matching system 9 and content of approximation determination between each concealed secret data will be described below.

The client terminal 1 includes a registration request unit 11 and a secret data generation unit 12. In the embodiment, a key 112 is represented by, for example, a numerical value.

The registration request unit 11 requests the secret data matching device 3 to register biometric data 111 and the key 112. For example, the registration request unit 11 receives the biometric data 111 and the key 112 from an external terminal. Then, the registration request unit 11 requests the secret data matching device 3 to register the received biometric data 111 and key 112. The external terminal may be a terminal connected through a network.

Here, the biometric data 111 is data of physical characteristics or behavioral characteristics of the client. Examples of the physical characteristics include fingerprint, vein, iris, and DNA. An example of the physical characteristics is handwriting. In the embodiment, the biometric data 111 is represented by a vector including n-dimensional component. The key 112 is key data which the client wants to register along with the biometric data. In the embodiment, the key 112 is represented by, for example, a numerical value.

The registration request unit 11 receives a linear combination (elements of lattice) corresponding to an approximation determination matrix 331 described later from the secret data matching device 3 as a response to the registration request and outputs the received elements of lattice to the secret data generation unit 12. When the registration request unit 11 receives a secret vector in which the biometric data 111 and the key 112 are concealed from the secret data generation unit 12, the registration request unit 11 requests the secret data matching device 3 to register the secret vector.

The secret data generation unit 12 generates the secret vector in which the biometric data 111 and the key 112 are concealed.

For example, the secret data generation unit 12 generates an (n+2)-dimensional vector in which "0" is attached to a last component of combined data of the biometric data 111 and the key 112 for the biometric data 111 and the key 112. Specifically, the secret data generation unit 12 generates the (n+2)-dimensional vector in which a one-dimensional component included in the key 112 and "0" which is an (n+2)th component are attached to the n-dimensional component included in the biometric data 111. As an example, it is assumed that the biometric data 111 is T indicating an n-dimensional component and the key 112 is K indicating a one-dimensional component. Then, the secret data generation unit 12 generates (T, K, 0) as the (n+2)-dimensional vector.

When the secret data generation unit 12 acquires the linear combination (elements of lattice) from the registration request unit 11, the secret data generation unit 12 generates a random number. Then, the secret data generation unit 12 generates a secret vector in which the generated (n+2)-dimensional vector is added to the product of the linear combination (elements of lattice) and the random number. As an example, if the random number is $r_1$ and the element of lattice is $b_1$, the secret vector is represented by $(T, K, 0)+r_1 \times b_1$. Then, the secret data generation unit 12 outputs the generated secret vector to the registration request unit 11.

The client terminal 2 includes a matching request unit 21 and a secret data generation unit 22.

The matching request unit 21 requests the secret data matching device 3 to match biometric data. The biometric data requested to be matched is matching data 211. In the embodiment, the matching data 211 is represented by a vector including n-dimensional component. The matching request unit 21 receives a linear combination (elements of lattice) corresponding to the approximation determination matrix 331 described later from the secret data matching device 3 as a response to the matching request and outputs the received elements of lattice to the secret data generation unit 22. When the matching request unit 21 receives a secret vector in which the matching data 211 is concealed from the secret data generation unit 22, the matching request unit 21 requests the secret data matching device 3 to match the secret vector. The elements of lattice received from the secret data matching device 3 are different from the elements of lattice received by the registration request unit 11 of the client terminal 1 when the registration is performed.

The secret data generation unit 22 generates the secret vector in which the matching data 211 is concealed.

For example, the secret data generation unit 22 generates an (n+2)-dimensional vector in which "0" is attached to the last component and the second last component of the matching data 211. Specifically, the secret data generation unit 22 generates the (n+2)-dimensional vector in which two "0" are attached to the n-dimensional component included in the matching data 211 as an (n+1)th component and an (n+2)th component. As an example, the matching data 211 is assumed to be Q that represents the n-dimensional component. Then, the secret data generation unit 22 generates (Q, 0, 0) as the (n+2)-dimensional vector.

When the secret data generation unit 22 acquires the linear combination (elements of lattice) from the matching request unit 21, the secret data generation unit 22 generates a random number. Then, the secret data generation unit 22 generates a secret vector in which the generated (n+2)-dimensional vector is added to the product of the linear combination (elements of lattice) and the random number. As an example, if the random number is $r_2$ and the element of lattice is $b_2$, the secret vector is represented by (Q, 0, 0)+$r_2 \times b_2$. Then, the secret data generation unit 22 outputs the generated secret vector to the matching request unit 21. Although any method can be used as the method to generate a random number, it is desirable that parameters are different between the client terminal 1 and the client terminal 2 so that the random numbers generated in the client terminals 1 and 2 do not overlap each other.

The secret data matching device 3 includes a registration unit 31, a authentication unit 32, and a storage unit 33. The registration unit 31 generates an approximation determination matrix described later and registers the generated approximation determination matrix in a database 330 in the storage unit 33. Further, the registration unit 31 registers secret data requested to be registered in the database 330 in the storage unit 33. The authentication unit 32 matches the secret data requested to be matched in which the matching data is concealed with the registered secret data and determines whether or not both secret data are approximate to each other.

The storage unit 33 is a storage device such as a hard disk or an optical disk. The storage unit 33 may be a data rewritable semiconductor memory such as a RAM (Random Access Memory), a ROM (Read Only Memory), a flash memory, and an NVSRAM (Non Volatile Static Random Access Memory).

The storage unit 33 stores the database 330. The database 330 stores the approximation determination matrix 331 and secret data 332. The approximation determination matrix 331 and secret data 332 are registered by the registration unit 31 described below. Details of the approximation determination matrix 331 will be described later.

The registration unit 31 includes a random number generation unit 311, an approximation determination matrix generation unit 312, an approximation determination matrix registration unit 313, and a secret data registration unit 314.

The random number generation unit 311 generates random numbers used in the approximation determination matrix 331 and outputs the generated random numbers to the approximation determination matrix generation unit 312. Here, the random numbers used in the approximation determination matrix 331 are random numbers added as the second last row and the last row of a square matrix that indicates threshold values of an approximation range when the approximation determination matrix 331 is generated. Threshold values of the approximation range are numerical values set as the approximation range by the client and are information indicating lengths in each dimension direction as vectors in the approximation range. For example, when the threshold values of the approximation range are "e, f, g", the random number generation unit 311 generates random numbers "h, i, j" that satisfy $e/2 \geq h$, $f/2 \geq i$, and $g/2 \geq j$, and any random numbers "k, l".

The approximation determination matrix generation unit 312 generates the approximation determination matrix 331 to perform approximation determination. The generated approximation determination matrix 331 is generated to be different for each system in which the secret data matching device 3 is mounted.

For example, the approximation determination matrix generation unit 312 generates a diagonal matrix in which the threshold values indicating the approximation range are diagonal components and the other components are "0". As an example, when the biometric data to be determined is information including n components, that is, when the biometric data 111 is n-dimensional information, the approximation determination matrix generation unit 312 generates an n×n diagonal matrix. Further, the approximation determination matrix generation unit 312 sets the threshold value of the key 112 at the (n+1)th row and the (n+1)th column. The threshold value of the key 112 is information indicating the maximum value of the key set by the client.

Then, the approximation determination matrix generation unit 312 generates an (n+2)×n matrix in which the second last and the last rows in which all components are "0" are attached to the generated n×n diagonal matrix. The approximation determination matrix generation unit 312 generates a random number vector having n components. The approximation determination matrix generation unit 312 generates a random number vector having components, the number of which is obtained by adding 2 to the number n of columns of the diagonal matrix (the number of which is the ordinal number of the last column). The random numbers generated by the random number generation unit 311 are set to the components of the random number vector. Then, the secret data matching device 3 generates an (n+2)×(n+2) square matrix, to which the random number vector is attached, as the approximation determination matrix 331.

The approximation determination matrix registration unit 313 registers the approximation determination matrix 331 generated by the approximation determination matrix generation unit 312 in the database 330.

Figures 2, 3:
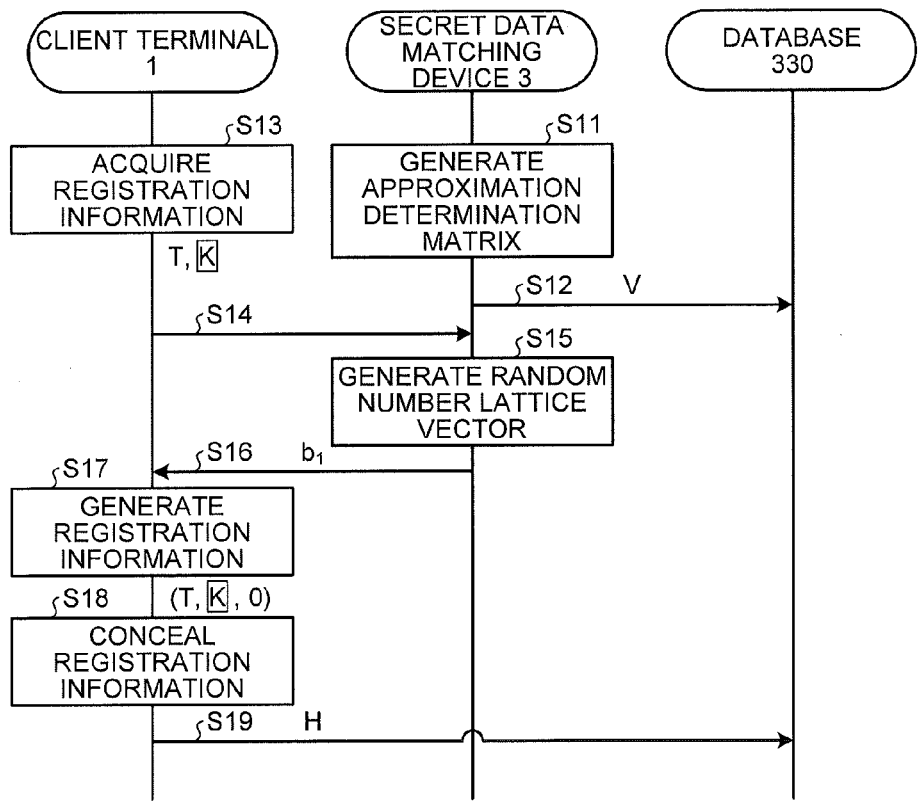
FIG. 2 is a diagram illustrating an approximation determination matrix according to the embodiment.
FIG. 3 is a diagram depicting a sequence of a secret data registration process according to the embodiment.

Here, the approximation determination matrix 331 will be described with reference to FIG. 2. FIG. 2 is a diagram illustrating the approximation determination matrix according to the embodiment. In the example depicted in FIG. 2, an example will be described in which biometric data and an approximation range are represented by three-dimensional numbers. As depicted in FIG. 2, an approximation determination matrix V corresponding to the approximation determination matrix 331 is a matrix in which the threshold value of the key and the random number vector are attached to a matrix for approximation determination in a range indicated by a dashed line.

The matrix for approximation determination includes threshold values, which specify lengths as vectors in each dimensional direction in the approximation range, as diagonal elements. For example, the example depicted in FIG. 2 indicates that the length of vector in an x axis direction in the approximation range is "20", the length of vector in a y axis direction in the approximation range is "10", and the length of vector in a z axis direction in the approximation range is "14". In other words, the matrix for approximation determination depicted in FIG. 2 is a matrix to determine whether or not two biometric data are included in a range of "±10" in the x axis direction, "±5" in the y axis direction, and "±7" in the z axis direction.

Further, "0, 0, 0" is attached in the fourth row for embedding a key. Further, "7, 4, 5, 20000" obtained by combining a random number vector "7, 4, 5" and the threshold value "20000" of the key is added in the fourth column. Then, "0, 0, 0, 0" is added in the fifth row that is the last row. Further, a random number vector "5, 3, −2, −42, 123" is added in the fifth column that is the last column. Although, in the example depicted in FIG. 2, the approximation range is specified by three-dimensional numbers, the embodiment is not limited to this, and any dimensional numbers may be used.

The secret data registration unit 314 registers secret data in the database 330. The registered secret data corresponds to a template protected in a key binding scheme.

For example, when the secret data registration unit 314 receives a registration request of the biometric data 111 and the key 112 from the client terminal 1, the secret data registration unit 314 generates random numbers for linear combination corresponding to the approximation determination matrix 331. As an example, the secret data registration unit 314 acquires row vectors $v_1, v_2, \ldots,$ and $v_{n+2}$ which include (n+2) components corresponding to the approximation determination matrix 331. Then, the secret data registration unit 314 selects appropriate integers $d_1, d_2, \ldots,$ and $d_{n+2}$ corresponding to the row vectors $v_1, v_2, \ldots,$ and $v_{n+2}$, respectively. Then, the secret data registration unit 314 calculates the sum of products of each row vector and each integer, that is, an (n+2)-dimensional vector represented by $d_1 \times v_1 + d_2 \times v_2 + \ldots + d_{n+2} \times V_{n+2}$ as the linear combination. The linear combination is the "elements of lattice". The secret data registration unit 314 selects a different set of integers $d_1, d_2, \ldots,$ and $d_{n+2}$ for each biometric data and calculates the linear combination which is the sum of products of the selected set of integers and each row vector of the approximation determination matrix 331.

The secret data registration unit 314 distributes the calculated linear combination, that is, the elements of lattice, to the client terminal 1 as a response to the registration request. When the secret data registration unit 314 receives a registration request of the secret data 332 from the client terminal 1, the secret data registration unit 314 registers the secret data 332 requested to be registered in the database 330.

The authentication unit 32 includes a matching request reception unit 321, a calculation unit 322, an approximation determination unit 323, and a key output unit 324.

When the matching request reception unit 321 receives a matching request from the client terminal 2, the matching request reception unit 321 generates random numbers for linear combination (elements of lattice) corresponding to the approximation determination matrix 331. The generation of the random numbers for linear combination is the same as that by the secret data registration unit 314, so that the description thereof will be omitted. The elements of lattice generated by the matching request reception unit 321 are generated to be different from the elements of lattice generated by the secret data registration unit 314 when the registration is performed.

The matching request reception unit 321 distributes the calculated linear combination, that is, the elements of lattice, to the client terminal 2 as a response to the matching request. When the matching request reception unit 321 receives a matching request of a secret vector in which the matching data 211 is concealed from the client terminal 2, the matching request reception unit 321 outputs the secret vector requested to be matched to the calculation unit 322.

The calculation unit 322 calculates a difference vector between the secret data 332 (secret vector) registered in the database 330 and the secret vector in which the matching data 211 is concealed and which is received from the client terminal 2. Then, the calculation unit 322 calculates a residual vector that is a residue when the approximation determination matrix 331 is used as a modulus from the calculated difference vector. As an example, when the difference vector is z and the approximation determination matrix 331 is V, the residual vector is represented by "z mod V". Then, the calculation unit 322 outputs the generated residual vector to the approximation determination unit 323.

The approximation determination unit 323 determines whether or not the last component of the residual vector received from the calculation unit 322 is "0", and if the last component of the residual vector is "0", the approximation determination unit 323 determines that the biometric data 111 of the registration source and the matching data 211 are approximate to each other. On the other hand, if the last component of the residual vector is not "0", the approximation determination unit 323 determines that the biometric data 111 of the registration source and the matching data 211 are not approximate to each other.

When it is determined that the biometric data 111 and the matching data 211 are approximate to each other, the key output unit 324 extracts the key 112 of the (n+1)th component from the residual vector. Then, the secret data matching device 3 outputs the extracted key 112 to the client terminal 2 which is the matching source.

Here, the principle of the approximation determination performed by the authentication unit 32 will be described. The principle will be described assuming that the approximation determination matrix 331 is the approximation determination matrix V. The linear combination of each row vector $v_1, v_2, \ldots,$ and $v_{n+2}$ of the approximation determination matrix V can be represented by a set L (a lattice L) whose elements are the linear combination $d_1 \times v_1 + d_2 \times v_2 + \ldots + d_{n+2} \times v_{n+2}$ of each row vector of the approximation determination matrix V. In other words, the linear combination of each row vector of the approximation determination matrix V corresponds to any one of intersections on the lattice formed by the elements of the set L.

A secret vector H in which the n-dimensional biometric data T and the key K are concealed is represented by the expression (1) below using an element $b_1$ of the lattice of the set L and a random number $r_1$. Here, [I, K, 0] is an (n+2)-dimensional vector in which the key K and "0" as the (n+2)th component are attached to the biometric data T.

$$H = [T, K, 0] + r_1 \times b_1 \qquad (1)$$

A secret vector H' in which n-dimensional matching data Q is concealed is represented by the expression (2) below using an element $b_2$ of the lattice of the set L and a random number $r_2$. Here, [Q, 0, 0] is an (n+2)-dimensional vector in which two "0" are attached to the matching data Q as the (n+1)th component and the (n+2)th component. Further, $b_2$ is different from $b_1$.

$$H' = [Q, 0, 0] + r_2 \times b_2 \qquad (2)$$

In this case, a difference vector z between the secret vectors H and H' is represented by the following expression (3).

$$z = H - H' = [T-Q, K, 0] + r_1 \times b_1 - r_2 \times b_2 \tag{3}$$

Here, $r_1 \times b_1 - r_2 \times b_2$ included in the difference vector z is a difference between the products of an element of the set L and a random number, so that $r_1 \times b_1 - r_2 \times b_2$ is included in the elements of the set L. In other words, $r_1 \times b_1 - r_2 \times b_2$ corresponds to any one of intersections on the lattice formed by the elements of the set L. When the residual vector of the approximation determination matrix V is calculated from the difference vector z, (z mod V) corresponds to mapping the difference vector z to a fundamental domain P (L) determined by the set L. Therefore, when the residual vector of the approximation determination matrix V is calculated from the difference vector z, $r_1 \times b_1 - r_2 \times b_2$ is ignored. Therefore, when z mod V is calculated, a lattice portion including a portion other than the front end portion of the difference vector z in the difference vector z is ignored and only one lattice including the front end portion of the difference vector z is mapped to the fundamental domain P (L). Specifically, the z mod V is represented by the following expression (4).

$$z \bmod V = [T-Q, K, 0] \bmod V \tag{4}$$

When the vector [T−Q,K,0] is included in the fundamental domain P (L), that is, when the biometric data T and the matching data Q are approximate to each other, z mod V=[T−Q, K, 0] is established. As a result, when the biometric data T and the matching data Q are approximate to each other, there is a high probability that the last component of the z mod V is "0".

On the other hand, when the vector [T−Q, K, 0] is not included in the fundamental domain P (L), that is, when the biometric data T and the matching data Q are not approximate to each other, z mod V=[T−Q, K, 0]+b is established when b is a certain element of the lattice belonging to the set L. As a result, when the biometric data T and the matching data Q are not approximate to each other, there is a high probability that the last component of the z mod V is a value other than "0".

Under this principle, the authentication unit 32 can calculate the residual vector of the approximation determination matrix V from the difference z between the secret vectors and perform approximation determination of the concealed biometric data based on the last component of the calculated residual vector. When the authentication unit 32 determines that the concealed biometric data is approximate as a result of the approximation determination, the authentication unit 32 extracts the key K from the secret vector H and outputs the extracted key K to the matching source.

Sequence of Secret Data Registration Process

Next, a sequence of a secret data registration process will be described with reference to FIG. 3. FIG. 3 is a diagram depicting the sequence of the secret data registration process according to the embodiment. In FIG. 3, the biometric data 111 of the client is represented by T, the client-unique key 112 is represented by K, the approximation determination matrix 331 is represented by V, and the secret vector is represented by H.

In the secret data matching device 3, the approximation determination matrix generation unit 312 generates the approximation determination matrix V (step S11). Then, the approximation determination matrix registration unit 313 registers the generated approximation determination matrix V in the database 330 (step S12).

In the client terminal 1, the registration request unit 11 acquires registration information (step S13). Here, the registration request unit 11 acquires the biometric data T and the key K as the registration information. Then, the registration request unit 11 requests the secret data matching device 3 to register the biometric data T and the key K (step S14).

In the secret data matching device 3, the secret data registration unit 314 that receives the registration request from the client terminal 1 generates a random number lattice vector (step S15). Here, the secret data registration unit 314 calculates a linear combination represented by the sum of products of each row vector of the approximation determination matrix V and each appropriate integer. The calculated linear combination is the random number lattice vector $b_1$, which is an element of lattice. Then, the secret data registration unit 314 transmits the calculated random number lattice vector (element of lattice) $b_1$ to the client terminal 1 (step S16).

In the client terminal 1, the secret data generation unit 12 generates registration information (step S17). Here, the secret data generation unit 12 generates a vector (T, K, 0) in which "0" is attached to the last component of the combined data of the biometric data T and the key K.

Then, the secret data generation unit 12 conceals the registration information (step S18). Here, the secret data generation unit 12 generates the secret vector H in which the generated vector (T, K, 0) is added to the product of the random number lattice vector (element of lattice) $b_1$ and a random number. When the random number is $r_1$, the secret vector H is represented by $(T, K, 0) + r_1 \times b_1$.

Then, the registration request unit 11 transmits the secret vector H to the secret data matching device 3 to request the secret data matching device 3 to register the secret vector H which is the registration information concealed by the secret data generation unit 12 (step S19). As a result, the secret vector H is registered in the database 330 in the secret data matching device 3.

Sequence of Secret Data Matching Process

Figure 4:
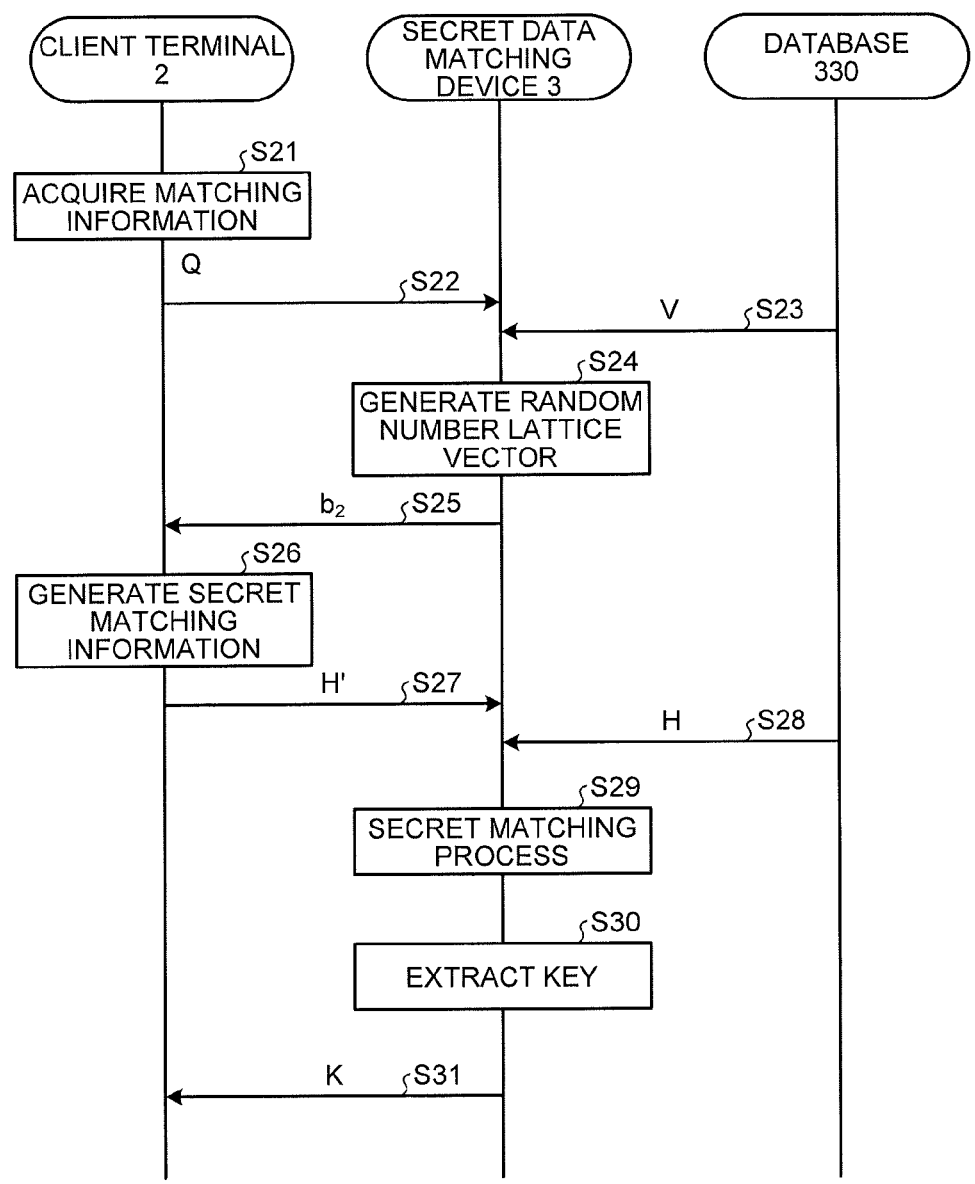
FIG. 4 is a diagram depicting a sequence of a secret data matching process according to the embodiment.

Next, a sequence of a secret data matching process will be described with reference to FIG. 4. FIG. 4 is a diagram depicting the sequence of the secret data matching process according to the embodiment. In FIG. 4, the matching data 211 of the client is represented by Q, the client-unique key 112 is represented by K, the approximation determination matrix 331 is represented by V, and the secret vectors are represented by H' and H.

In the client terminal 2, the matching request unit 21 acquires matching information (step S21). Here, the matching request unit 21 acquires the matching data Q as the matching information. Then, the matching request unit 21 requests the secret data matching device 3 to match the matching data Q (step S22).

In the secret data matching device 3, the matching request reception unit 321 that receives the matching request from the client terminal 2 acquires the approximation determination matrix V from the database 330 (step S23). Then, the matching request reception unit 321 generates a random number lattice vector (step S24). Here, the matching request reception unit 321 calculates a linear combination represented by the sum of products of each row vector of the acquired approximation determination matrix V and each appropriate integer. The calculated linear combination is the random number lattice vector $b_2$, which is an element of lattice. Then, the matching request reception unit 321 transmits the calculated random number lattice vector (element of lattice) $b_2$ to the client terminal 2 (step S25). Here, $b_2$ and $b_1$ are different from each other.

In the client terminal 2, the secret data generation unit 22 generates secret matching information (step S26). Here, the secret data generation unit 22 generates a vector (Q, 0, 0) in which two "0"s are attached to the matching data Q. Then, the secret data generation unit 22 generates the secret vector H' in which the generated vector (Q, 0, 0) is added to the product of the random number lattice vector (element of lattice) $b_2$ and a random number. When the random number is $r_2$, the secret vector H' is represented by (Q, 0, 0)+$r_2 \times b_2$. Then, the matching request unit 21 transmits the secret vector H' to the secret data matching device 3 to request the secret data matching device 3 to match the secret vector H' (step S27).

In the secret data matching device 3, the calculation unit 322 acquires the secret vector H from the database 330 (step S28). Then, the approximation determination unit 323 performs the matching process by using a residual vector calculated from a difference vector between the secret vector H' requested to be matched and the acquired secret vector H without changing the secret state of the secret vectors (step S29). Here, the approximation determination unit 323 determines whether or not the last component of the residual vector is "0". If the last component of the residual vector is "0", the approximation determination unit 323 determines that the biometric data T of the registration source and the matching data Q are approximate to each other. On the other hand, if the last component of the residual vector is not "0", the approximation determination unit 323 determines that the biometric data T of the registration source and the matching data Q are not approximate to each other.

When it is determined that the biometric data T and the matching data Q are approximate to each other, the key output unit 324 extracts the user-unique key K from the residual vector (step S30). Then, the key output unit 324 transmits the extracted key K to the client terminal 2 that requests the matching (step S31).

Thereby, thereafter, the client terminal 2 can perform an authentication check by using the extracted client-unique key K. As an example, in the client terminal 2, if the extracted client-unique key K is used as a secret key, an authentication check based on a public key authentication method can be performed by using the secret key and a public key that is stored in advance.

The secret data matching device 3 can satisfy the diversity in the key binding method in the biometric template protection. Specifically, the secret data matching device 3 generates the secret vector H to be registered in the database 330 according to the approximation determination matrix V for the biometric data T and the client-unique key K. It is assumed that the secret vectors $H_1$ and $H_2$ are generated from two different approximation determination matrixes $V_1$ and $V_2$, respectively, for the biometric data T and the client-unique key K. When $b_1$ is an element of lattice generated from the approximation determination matrix $V_1$, the secret vector $H_1$ generated from the approximation determination matrix $V_1$ is represent by (T, K, 0)+$r_1 \times b_1$. When $b_2$ is an element of lattice generated from the approximation determination matrix $V_2$, the secret vector $H_2$ generated from the approximation determination matrix $V_2$ is represent by (T, K, 0)+$r_2 \times b_2$. Then, the approximation determination matrixes $V_1$ and $V_2$ are different from each other, so that $b_1$ and $b_2$ are different from each other. Thus, it is difficult for the common information to obtain from the two secret vectors $H_1$ and $H_2$. Therefore, if the approximation determination matrixes $V_1$ and $V_2$ are different from each other for each system, the secret vectors $H_1$ and $H_2$ are not cross-matched for the biometric data T and the client-unique key K. That is to say, the diversity is satisfied.

Specific Example of Registration Process and Matching Process of Secret Data

Next, the registration process and the matching process of the secret data according to the embodiment will be described using specific examples. It is assumed that the secret data matching system 9 uses three-dimensional data as biometric data. For example, it is assumed that the biometric data T of a first user inputted in the client terminal 1 is [123, 512, 120] and the key K is "6497" when they are registered. It is assumed that the approximation determination matrix V depicted in FIG. 2 is generated by the secret data matching device 3.

Specific Example of Registration Process of Secret Data

The secret data matching device 3 that receives a registration request of the biometric data T and the key K from the client terminal 1 sets each row vector $v_1$ to $v_5$ in the approximation determination matrix V. Then, the secret data matching device 3 calculates a linear combination $b_1$ represented by the sum of products of each row vector $v_1$ to $v_5$ and each appropriate integer. Here, the linear combination $b_1$ is represented by the following expression (5).

$$b_1 = 2 \times v_1 + 3 \times v_2 - 5 \times v_3 - v_4 + 5 \times v_5 = [40, 30, -70, -1999999, 686] \quad (5)$$

Then, the secret data matching device 3 transmits the calculated linear combination $b_1$ to the client terminal 1.

The client terminal 1 that receives the linear combination $b_1$ generates a secret vector H in which a vector (T, K, 0) in which "0" is attached to the last component of the combined data of the biometric data T and the key K is added to the product of the linear combination $b_1$ and a random number. Here, when the random number $r_1$ selected by the client is "7", the secret vector H is represented by the following expression (6).

$$H = [T, K, 0] + r_1 \times b_1 = [403, 722, -370, 133496, \mathbf{4802}] \quad (6)$$

Then, the client terminal 1 transmits the calculated secret vector H to the secret data matching device 3. The secret vector H is registered in the database 330 by the secret data matching device 3.

Specific Example 1 of Matching Process of Secret Data

As an example, it is assumed that matching data Q1 of the first user inputted in the client terminal 2 is [122, 514, 124] when the matching is performed.

The secret data matching device 3 that receives a matching request of the matching data Q1 from the client terminal 2 sets each row vector $v_1$ to $v_5$ in the approximation determination matrix V. Then, the secret data matching device 3 calculates a linear combination $b_2$ represented by the sum of products of each row vector $v_1$ to $v_5$ and each appropriate integer. Here, the linear combination $b_2$ is represented by the following expression (7).

$$b_2 = 5 \times v_1 - 2 \times v_2 + 7 \times v_3 + v_5 = [100, 20, 98, 62, 128] \quad (7)$$

Then, the secret data matching device 3 transmits the calculated linear combination $b_2$ to the client terminal 2.

The client terminal 2 that receives the linear combination $b_2$ generates a secret vector H1 in which a vector (Q1, 0, 0) in which two "0" are attached to the matching data Q1 is added to the product of the linear combination $b_2$ and a random number. Here, when the random number $r_2$ selected by the client is "123", the secret vector H1 is represented by the following expression (8).

$$H1 = [Q1, 0, 0] + r_2 \times b_2 = [12422, -1946, 12178, 7626, 15744] \quad (8)$$

Then, the client terminal 2 transmits the secret vector H1 to the secret data matching device 3 to request the secret data matching device 3 to match the calculated secret vector H1.

Subsequently, the secret data matching device 3 calculates a residual vector using the approximation determination matrix V as a modulus from a difference vector $z_1$ between the secret vector H1 requested to be matched and the registered secret vector H. Here, the difference vector $z_1$=(H−H1) is calculated and the residual vector using the approximation determination matrix V as a modulus is calculated as the following expression (9).

$$z_1 \bmod V = z_1 - [z_1 \times V^{-1}] \times V = [1, -2, -4, 6497, 0] \quad (9)$$

Then, the secret data matching device 3 determines that the biometric data T of the registration source and the matching data Q1 are approximate to each other because the last component of the residual vector calculated from the secret vector H1 is "0". Then, the secret data matching device 3 extracts the key K of the second last component of the residual vector. Here, "6497" is extracted as the key K.

Then, the secret data matching device 3 transmits "6497" to the client terminal 2 that requests the matching.

Specific Example 2 of Matching Process of Secret Data

As another example, it is assumed that matching data Q2 that is biometric data of a second user inputted in the client terminal 2 is [121, 555, 123] when the matching is performed.

The secret data matching device 3 that receives a matching request of the matching data Q2 from the client terminal 2 sets each row vector $v_1$ to $v_5$ in the approximation determination matrix V. Then, the secret data matching device 3 calculates a linear combination $b_2$ represented by the sum of products of each row vector $v_1$ to $v_5$ and each appropriate integer. Here, the linear combination $b_2$ is represented by the expression (7) described above.

Then, the secret data matching device 3 transmits the calculated linear combination $b_2$ to the client terminal 2.

The client terminal 2 that receives the linear combination $b_2$ generates a secret vector H2 in which a vector (Q2, 0, 0) in which two "0" are attached to the matching data Q2 is added to the product of the linear combination $b_2$ and a random number. Here, when the random number $r_3$ selected by the client is "−17", the secret vector H2 is represented by the following expression (10).

$$H_2 = [Q2, 0, 0] + r_3 \times b_2 = [-1579, 895, -1543, -1054, -2176] \quad (10)$$

Then, the client terminal 2 transmits the secret vector H2 to the secret data matching device 3 to request the secret data matching device 3 to match the calculated secret vector H2.

Subsequently, the secret data matching device 3 calculates a residual vector using the approximation determination matrix V as a modulus from a difference vector $z_2$ between the secret vector H2 requested to be matched and the registered secret vector H. Here, the difference vector $z_2$=(H−H2) is calculated and the residual vector using the approximation determination matrix V as a modulus is calculated as the following expression (11).

$$z_2 \bmod V = z_2 - [z_2 \times V^{-1}] \times V = [2, -3, -3, 6513, 12] \quad (11)$$

Then, the secret data matching device 3 determines that the biometric data T of the registration source and the matching data Q2 are not approximate to each other because the last component of the residual vector calculated from the secret vector H2 is not "0". Then, the secret data matching device 3 transmits information indicating that the matching fails to the client terminal 2. The secret data matching device 3 may transmit the second last component "6513" of the residual vector instead of the information indicating that the matching fails.

Effect of Embodiment

According to the embodiment described above, the secret data matching device 3 registers a first secret vector obtained by concealing the biometric data and the key based on a first linear combination of row vectors of the approximation determination matrix 331 different for each system including the secret data matching device 3 and a first random number in the database 330. Then, the secret data matching device 3 acquires a second secret vector obtained by concealing the matching data based on a second linear combination of row vectors of the approximation determination matrix 331 and a second random number. Then, the secret data matching device 3 calculates a residual vector that is a residue when the approximation determination matrix 331 is used as a modulus from a difference between the first secret vector and the second secret vector. Then, the secret data matching device 3 determines whether or not the biometric data and the matching data are approximate to each other based on the calculated residual vector, and when the biometric data and the matching data are approximate to each other, the secret data matching device 3 extracts the key from the residual vector. According to this configuration, the secret data matching device 3 performs approximation determination by using the secret vector concealed by the linear combination corresponding to the approximation determination matrix 331 different for each system including the secret data matching device 3, and when the approximation is determined, the secret data matching device 3 extracts the key. Therefore, even when another system conceals the same data by using another approximation determination matrix 331, the secret vectors generated from each approximation determination matrix 331 respectively do not have the same portion, so that the secret vectors do not cross-match each other. Therefore, the secret data matching device 3 can improve the diversity in the key binding method.

According to the embodiment described above, the secret data matching device 3 acquires the second secret vector based on the second linear combination different from the first linear combination used when generating the first secret vector and the second random number. According to this configuration, the secret data matching device 3 acquires the second secret vector that uses a linear combination different from the linear combination used when generating the first secret vector, so that it is difficult for the relevance between the secret vectors to distinguish. Therefore, it is possible to prevent information from being leaked.

According to the embodiment described above, the secret data matching device 3 outputs the extracted key to the determination request source of the matching data. According to this configuration, the determination request source can perform authentication check by using the received key.

Others

In the embodiment, a case is described in which the secret data matching device 3 registers the secret data 332 in which the biometric data 111 and the key 112 related to one client are concealed in the database 330 and matches the registered secret data 332 with secret data in which the matching data 211 is concealed. However, the secret data matching device 3 may register a plurality of secret data 332 in which the biometric data 111 and the key 112 related to a plurality of clients are concealed, respectively, in the database 330. In this case, when the secret data matching device 3 receives a matching request, the secret data matching device 3 may select the registered secret data 332 one by one and match the selected secret data 332 with secret data in which the matching data 211 requested to be matched is concealed. If the secret data matching device 3 determines that the selected secret data 332 and the secret data are approximate to each other as a result of the matching, the secret data matching device 3 may extract the key 112 from the residual vector generated when the matching is performed and transmit the key 112 to the matching request source.

In the embodiment, it is described that the secret data matching device 3 determines whether or not the biometric data 111 of the registration source and the matching data 211 are approximate to each other by determining whether or not the last component of the residual vector generated when the matching is performed is "0". However, it is not limited to this, and the secret data matching device 3 may determine whether or not the biometric data 111 of the registration source and the matching data 211 are approximate to each other by determining whether or not a plurality of components of the residual vector are "0".

For example, when the biometric data to be determined is information including n components, that is, when the biometric data 111 is n-dimensional information, the approximation determination matrix generation unit 312 generates an n×n diagonal matrix. Further, the approximation determination matrix generation unit 312 attaches a row vector in which components of (n+1)th row are "0" to the n×n diagonal matrix. Then, the approximation determination matrix generation unit 312 attaches a column vector in which an n-dimensional random number vector and the threshold value of the key 112 are combined to the (n+1)th column. Then, the approximation determination matrix generation unit 312 attaches a row vector in which components of (n+2)th row are "0". Then, the approximation determination matrix generation unit 312 generates an (n+2)×(n+2) matrix by attaching an (n+2)-dimensional random number vector to the (n+2)th column.

Further, the approximation determination matrix generation unit 312 attaches a row vector in which components of (n+3)th row are "0". The approximation determination matrix generation unit 312 may generates an (n+3)×(n+3) approximation determination matrix 331 by attaching an (n+3)-dimensional random number vector to the (n+3)th column.

Then, the secret data matching device 3 calculates an (n+3)-dimensional residual vector using the approximation determination matrix 331 as a modulus by performing the same processing as that in the embodiment. Then, the secret data matching device 3 can perform approximation determination by determining whether or not all the components from the (n+2)th dimension to the (n+3)th dimension of the residual vector are "0". Thereby, the secret data matching device 3 can improve accuracy of the approximation determination. In the same manner, if the approximation determination matrix generation unit 312 generates an (n+m)×(n+m) approximation determination matrix 331 (m is a natural number greater than 3), it is possible to further improve the accuracy of the approximation determination.

In the embodiment, a case is described in which the secret data matching device 3 is used for the approximation determination of the biometric data 111. However, the secret data matching device 3 is not limited to this, and the secret data matching device 3 can be used for secret similarity determination between confidential texts. For example, the client terminal 1 extracts characteristic characters or text portion from a confidential text and generates a feature amount vector indicating the feature amount of the extracted portion. Then, the client terminal 1 generates a secret vector in which the generated feature amount vector and a key are concealed by performing the same process as that in the embodiment and registers the secret vector in the database 330 of the secret data matching device 3. Then, the secret data matching device 3 may match a secret vector which is generated by the client terminal 2 and in which a feature amount vector desired to be matched is concealed with the registered secret vector by performing the same process as that in the embodiment.

The secret data matching device 3 can be realized by mounting each function of the registration unit 31, the authentication unit 32, and the like in an information processing device such as known personal computer and workstation.

The components of the device depicted in the drawing need not necessarily be physically configured as depicted in the drawing. In other words, specific forms of distribution and integration of the device are not limited to those illustrated in the drawing, and all or part of the device can be functionally or physically distributed or integrated in arbitrary units according to various loads and the state of use. For example, the random number generation unit 311 and the approximation determination matrix generation unit 312 may be integrated into one unit. On the other hand, the approximation determination matrix generation unit 312 may be divided into a first setting unit that sets the threshold values indicating the approximation range and the threshold value of the key in a matrix and a second setting unit that sets random numbers. Further, the database 330 may be an external device connected to the secret data matching device 3 or may be an external device connected through a network.

Figure 5:
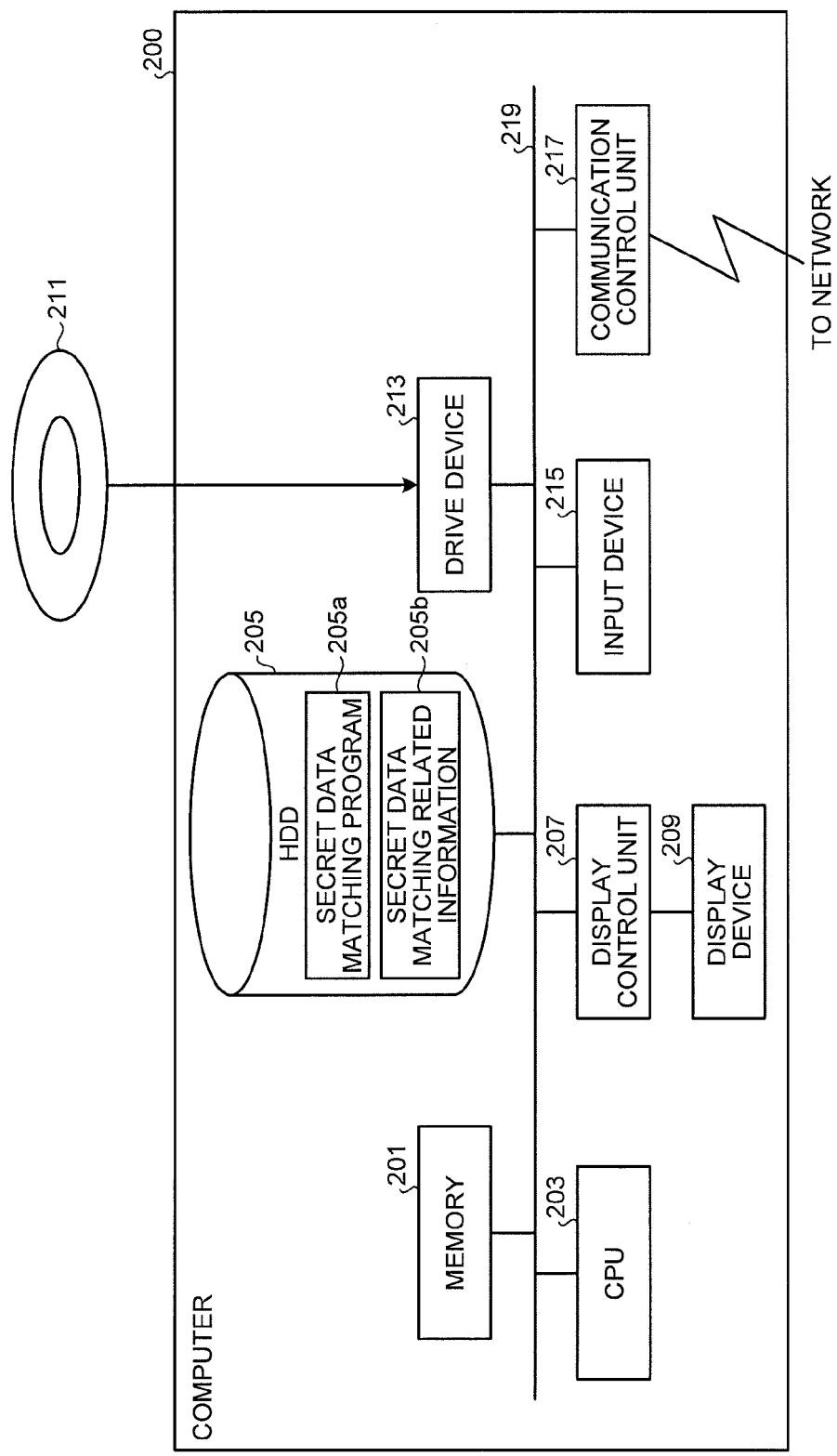
FIG. 5 is a diagram depicting an example of a computer that executes a secret data matching program.

The various processes described in the above embodiment can be realized by executing a program prepared in advance on a computer such as a personal computer or a workstation. Therefore, an example of a computer that executes a secret data matching program that realizes the same function as that of the secret data matching device 3 depicted in FIG. 1 will be described below. FIG. 5 is a diagram depicting an example of the computer that executes the secret data matching program.

As depicted in FIG. 5, a computer 200 includes a CPU 203 that performs various arithmetic processes, an input device 215 that receives input of data from a user, and a display control unit 207 that controls a display device 209. The computer 200 further includes a drive device 213 that reads a program and the like from a storage medium and a communication control unit 217 that transmits and receives data to and from another computer through a network. The computer 200 further includes a memory 201 that temporarily stores various information and an HDD 205. The memory 201, the CPU 203, the HDD 205, the display control unit 207, the drive device 213, the input device 215, and the communication control unit 217 are connected by a bus 219.

For example, the drive device 213 is a device for a removable disk 211. The HDD 205 stores a secret data matching program 205a and secret data matching related information 205b.

The CPU 203 reads the secret data matching program 205a, expandes the secret data matching program 205a in the memory 201, and executes a secret data matching program 205a as a process. This process corresponds to each functional unit in the secret data matching device 3. The secret data matching related information 205b corresponds to the approximation determination matrix 331 and the secret data 332. For example, the removable disk 211 stores each piece of information such as the secret data matching program 205a.

The secret data matching program 205a need not necessarily be stored in the HDD 205 from the beginning. For example, the program is stored in a "portable physical medium" such as a flexible disk (FD), a CD-ROM, a DVD disk, a magneto-optical disk, and an IC card that are inserted in the computer 200. Then, the computer 200 may read the secret data matching program 205a from such a medium and execute the secret data matching program 205a.

According to one mode of a system disclosed in the present application, it is possible to improve the diversity in the key binding method in the biometric template protection.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A secret data matching device comprising:
a memory; and
a processor coupled to the memory, wherein the processor executes a process including:
storing a first secret vector provided by a first terminal device, wherein the first terminal device obtains the first secret vector concealing first data and key data based on a first random number and a first linear combination of row vectors, wherein the first linear combination is provided for the first terminal device by the secret data matching device and the row vectors are of a determination matrix wherein the determination matrix is generated by attaching a random number vector as a last column to a matrix including diagonal components including a threshold value to determine whether the first data and second data are approximate to each other and a threshold value related to the key data and generated differently for a plurality of systems each including the secret data matching device;
acquiring a second secret vector from a second terminal device, wherein the second terminal device obtains the second secret vector concealing the second data based on a second linear combination of row vectors of the determination matrix and a second random number, the second linear combination being provided for the second terminal device by the secret data matching device;
calculating a residual vector that is a residue when the determination matrix is used as a modulus into a difference between the first secret vector stored at the storing and the second secret vector acquired at the acquiring;
determining whether or not the first data and the second data are approximate to each other based on the residual vector calculated at the calculating; and
extracting the key data from the residual vector when it is determined that the first data and the second data are approximate to each other as a result of a determination at the determining, and providing the extracted key data to the second terminal device.

2. The secret data matching device according to claim 1, wherein the acquiring includes acquiring the second secret vector that is obtained by the second terminal device based on the second linear combination different from the first linear combination used when the first secret vector is obtained and the second random number.

3. A non-transitory computer-readable recording medium having stored therein a program that causes a computer to execute a secret data matching process comprising:
registering in a storage a first secret vector provided by a first terminal device, wherein the first terminal device obtains the first secret vector concealing first data and key data based on a first random number and a first linear combination of row vectors, wherein the first linear combination is provided for the first terminal device by the computer and the row vectors are of a determination matrix wherein the determination matrix is generated by attaching a random number vector as a last column to a matrix including diagonal components including a threshold value to determine whether the first data and second data are approximate to each other and a threshold value related to the key data and generated differently for a plurality of systems each including the computer;
acquiring a second secret vector from a second terminal device, wherein the second terminal device obtains the second secret vector concealing the second data based on a second linear combination of row vectors of the determination matrix and a second random number, the second linear combination being provided for the second terminal device by the computer;
calculating a residual vector that is a residue when the determination matrix is used as a modulus into a difference between the first secret vector stored in the storage and the second secret vector acquired by the acquiring process;
determining whether or not the first data and the second data are approximate to each other based on the residual vector calculated by the calculating process; and
extracting the key data from the residual vector when it is determined that the first data and the second data are approximate to each other as a result of a determination by the determining process, and providing the extracted key data to the second terminal device.

4. A secret data matching method comprising:
registering in a storage, by a processor included in a computer, a first secret vector provided by a first terminal device, wherein the first terminal device obtains the first secret vector concealing first data and key data based on a first random number and a first linear combination of row vectors, wherein the first linear combination is provided for the first terminal device by the processor and the row vectors are of a determination matrix wherein the determination matrix is generated by attaching a random number vector as a last column to a matrix including diagonal components including a threshold value to determine whether the first data and second data are approximate to each other and a threshold value related to the key data and generated differently for a plurality of systems each including the computer;
acquiring, by the processor, a second secret vector from a second terminal device, wherein the second terminal device obtains the second secret vector concealing the second data based on a second linear combination of row vectors of the determination matrix and a second random number, the second linear combination being provided for the second terminal device by the processor;

calculating, by the processor, a residual vector that is a residue when the determination matrix is used as a modulus into a difference between the first secret vector stored in the storage and the acquired second secret vector;

determining, by the processor, whether or not the first data and the second data are approximate to each other based on the calculated residual vector; and extracting, by the processor, the key data from the residual vector when it is determined that the first data and the second data are approximate to each other as a result of a determination at the determining, and providing the extracted key data to the second terminal device.

* * * * *